(12) United States Patent
Branson

(10) Patent No.: US 7,876,090 B2
(45) Date of Patent: Jan. 25, 2011

(54) CALIBRATION METHOD AND CALIBRATION APPARATUS FOR A HAND-HELD LOCATING DEVICE

(75) Inventor: Simon Branson, Whiston (GB)

(73) Assignee: Leica Geosystems AG, Heerbrugg (CH)

( * ) Notice: Subject to any disclaimer, the term of this patent is extended or adjusted under 35 U.S.C. 154(b) by 344 days.

(21) Appl. No.: 12/296,244

(22) PCT Filed: Jan. 24, 2007

(86) PCT No.: PCT/EP2007/000574

§ 371 (c)(1),
(2), (4) Date: Oct. 6, 2008

(87) PCT Pub. No.: WO2007/112798

PCT Pub. Date: Oct. 11, 2007

(65) Prior Publication Data

US 2009/0273339 A1    Nov. 5, 2009

(30) Foreign Application Priority Data

Apr. 6, 2006   (EP)   ................................ 06112302

(51) Int. Cl.
*G01R 35/00*   (2006.01)
(52) U.S. Cl. .................................................... 324/202
(58) Field of Classification Search ...................... None
See application file for complete search history.

(56) References Cited

U.S. PATENT DOCUMENTS

| 3,826,976 | A | 7/1974 | Winston et al. |
| 4,983,912 | A | 1/1991 | Roehrlein et al. |
| 7,196,604 | B2* | 3/2007 | Sills et al. ................... 335/306 |
| 2009/0201024 | A1* | 8/2009 | Bosnar ....................... 324/344 |

FOREIGN PATENT DOCUMENTS

| JP | 2001-091663 | 4/2001 |
| WO | 2004/003585 A1 | 1/2004 |

* cited by examiner

*Primary Examiner*—Jermele M Hollington
(74) *Attorney, Agent, or Firm*—Workman Nydegger

(57) ABSTRACT

A calibration apparatus for a hand-held locating device (7) has at least one first coil configuration (1*a*) having a first measuring range (2') and a second coil configuration (1*a*') having a second measuring range (2*a*'), in which measuring ranges (2*a*, 2*a*') homogeneous alternating magnetic fields can be generated in a specifiable ratio with respect to the strength of the magnetic fields. The coil configurations (1*a*, 1*a*') are arranged a specifiable distance apart so that the magnetic fields can be detected simultaneously by means of at least two aerials of the locating device (7) which are arranged at a fixed distance. The specifiable ratios define true distance parameters.

17 Claims, 4 Drawing Sheets

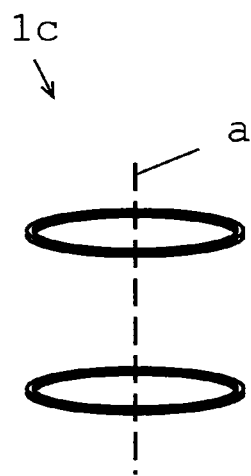 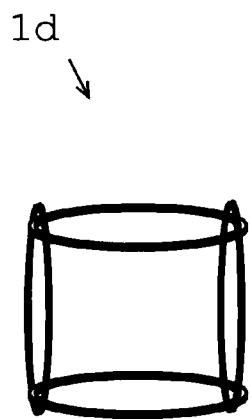 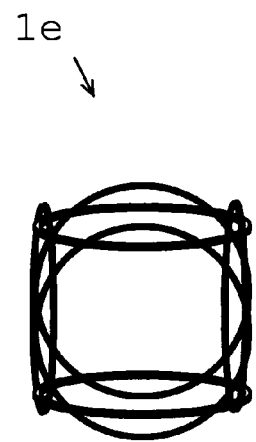
Fig. 3A  Fig. 3B  Fig. 3C
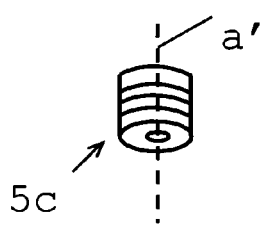 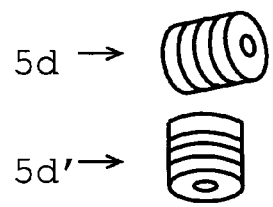 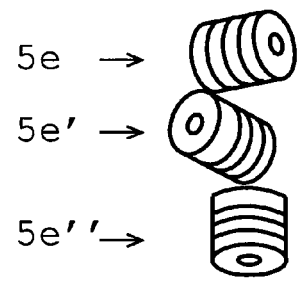
Fig. 3D  Fig. 3E  Fig. 3F

CALIBRATION METHOD AND CALIBRATION APPARATUS FOR A HAND-HELD LOCATING DEVICE

This application is a 371 of PCT/EP07/00574 Jan. 24, 2007.

The invention relates to a calibration method for a hand-held locating device according to claim 1 and a calibration apparatus for a hand-held locating device according to the precharacterizing clause of claim 8.

Supply lines laid underground, such as high-voltage and low-voltage cables, telecommunication cables or water pipes, can often be located on the basis of the time-variable magnetic fields of the lines. The magnetic fields are generated, for example, as a result of current flows through the lines, as in the case of high-voltage or low-voltage cables operating with alternating current. Alternatively, the fields are fields generated by means of application of electromagnetic signals to the lines or fields reflected at the lines. The application is effected by direct application to conductive supply lines or by means of induction of a magnetic field in the line. An alternating magnetic field of a conductive supply line can also be induced by signals from remote transmitters, such as radio signals from radio transmitters. The fields may also emanate from transmitters on or in the lines. For example, in nonconductive supply lines, such as clay pipes or plastic pipes, a conductor is introduced—or the conductor is laid next to the supply lines—and fed with alternating current. The lines are located on the basis of locating devices having one or more measuring means, such as receiving aerials, for measuring the fields.

The strength of the magnetic field is a measure of the distance of the source—i.e. of the line or of the transmitter—from the measuring location. For a straight conductor through which current is flowing, the strength of the magnetic field decreases in inverse proportion to the distance d—$B \sim k/d$, and, in the case of magnetic dipole field, it decreases in inverse proportion to the distance d to the power of three—$B \sim k/d^3$, where k designates a proportionality constant and B the magnitude of the magnetic field.

In order to determine the distance of a supply line from the locating device or from its aerials and thus to determine the depth of the supply line without a knowledge of the proportionality constant k, customary locating devices have identical aerials arranged at a fixed distance to one another along a vertical to the idealised surface of the Earth as a reference surface. By means of the aerials such a distance apart, the field of the line can be measured at two measuring positions a distance apart along the vertical (i.e. for two distances to the line). The ratio of the measured fields can then be calculated so that the proportionality constant cancels out. From the measured fields and the known relative spacing of the aerials, it is then possible to determine the distance to the line.

Such locating devices having two aerials arranged a distance apart must be calibrated at periodical time intervals since aging and drift effects of the aerials can cause inaccuracies of measurement in the depth determination of the supply lines, with the result that in certain circumstances major damage may result.

This calibration of the locating device is usually carried out using a pair of Helmholtz coils, in the measuring range of which a homogeneous magnetic field known with respect to strength and direction and adjustable and variable in a defined manner, for example by means of the coil current, is known to be present between the coils. The aerials of the locating device are positioned in each case—or simultaneously in the case of a large measuring range—in the measuring range and calibrated with respect to the set magnetic fields.

Since the distance to the supply line is determined using the locating device during a work assignment, it is advantageous to be able to calibrate the locating device with respect to the distance measurement. With a calibration of the locating device with respect to a distance measurement, it is possible, inter alia, to eliminate any inaccuracies resulting from the arrangement of the aerials a distance apart.

An object of the invention is therefore to provide a calibration method for calibrating a locating device, having at least two aerials arranged a fixed distance apart, with respect to distance determinations. A further object is the provision of a calibration apparatus for calibrating the locating device with respect to distance determinations.

These objects are achieved by the subjects of Claims 1 and 8 or of the dependent claims, or the achievements are further developed.

The calibration method according to the invention is based on the generation of known alternating magnetic fields in a ratio which can be specified with respect to the strength of the magnetic fields. Furthermore, the magnetic fields are generated in measuring positions which are a distance away corresponding to the spaced arrangement of the aerials of the locating device to be calibrated. This makes it possible to calibrate aerials arranged at fixed distances from one another under laboratory conditions with respect to field ratios.

The magnetic fields are generated in discretely specifiable ratios with respect to their magnitude. By generating a first magnetic field in a first measuring position or measuring range and a second magnetic field, weaker relative to the first one, in a second measuring position and optionally further magnetic fields, weaker relative to the first and second fields, in further measuring positions, it is possible to simulate a field of a supply line for two or more distances.

The strength of the field of the supply line decreases with increasing distance from the supply line. A hand-held location device having a plurality of aerials is held in the working position so that the aerials assume a first, second and optionally further distance from the supply line. The aerials are thus arranged a distance apart along a vertical to the idealised surface of the Earth, relative to the working position of the locating device. The aerial arranged furthest away from the line measures the weakest field.

The situation is artificially produced in the method according to the invention. The measurement of the two or more fields of different strength thus corresponds to a measurement of a single field for two or more different distances. From the ratio of the fields and the known relative distance of the measuring positions, it is possible—as mentioned above—to determined the distance to the measuring position or to a reference position which is known relative to a measuring position.

The calibration method according to the invention uses theoretically or empirically specified distance-to-field ratio relationships. The relationships represent an assignment of a field ratio to a distance to the transmitter for a known field of a transmitter. The assignments are, for example, stored in a table of values or can be read from a curve. The establishment of known fields identical except for the strength in a defined strength ratio may therefore be regarded as the establishment of a true distance parameter. Hence the ratio represents a true distance parameter for a line at said true distance.

The alternating magnetic fields are measured by means of aerials of the locating device to be calibrated, which aerials are positioned in the measuring ranges. The ratio of the magnitudes of the fields can be derived from the measurements. In an initial calibration of a locating device, the true distance parameter is coordinated as a calibration setting with the measured actual ratio, for example by input into software of the locating device.

The recalibration of a locating device can be effected in an analogous manner. Alternatively, in the recalibration, the distance parameters which are coordinated by means of the locating device—from the field ratio-to-distance magnitude relationships stored in the locating device—with the measured values and represent the distance parameters apparent in the recalibration can be compared with the true distance parameters. In the case of a deviation of the apparent from the true distance parameters, the apparent distance parameters are replaced by the true distance parameters as a calibration setting, or a correction value is determined as a calibration setting from the comparison, with which correction value the apparent distance parameters are corrected. The distance parameters may be scalar or vectorial parameters.

The calibration method according to the invention is advantageously carried out with a plurality of discrete ratios which may be taken, for example, from a specifiable quantity of discrete ratios, i.e. for a discrete number of distance parameters. The number may be distributed, for example, in discrete steps over the measuring range of the locating device. Parameters lying between the discrete parameters can be determined, for example, by interpolation. The discrete parameters may be distributed equidistantly over the measuring range of the locating device. However, it is also possible to determine a larger number of calibration settings for the locating device in a part-range of its measuring range, which part-range is, for example, critical with respect to inaccuracies of measurement or relevant with respect to typical depths of customary supply lines.

The calibration may furthermore be effected for a discrete number of different frequencies. The frequencies can be chosen with respect to typical fields of underground supply lines. Such frequencies are, for example, 50 Hz to 60 Hz frequencies of power cables or radio frequencies in the range of 15 kHz to 30 kHz.

For locating devices which can detect a plurality of frequencies, the calibration method is advantageously repeated for the plurality of frequencies. In addition or alternatively, repetitions with different field ratios are foreseeable. For example, a specifiable or specified quantity of ratios—as mentioned above—is run through, and it is also possible to select ratios.

The use of selective frequencies or running through a sequence of frequencies and a choice or sequential setting of ratios can be effected in an automated manner using an appropriate control. The calibration of the locating device can also be automated.

For calibrating the locating device, a calibration apparatus according to the invention is furthermore provided. For a locating device having two aerials a distance apart, the calibration apparatus has two coil arrangements for generating homogeneous alternating magnetic fields. For locating devices having three or more aerials, the calibration apparatus accordingly has three or more coil arrangements. The magnetic fields of the coil arrangements can—as described above—be generated in such a way that they represent an alternating field of an underground line at two measuring positions located one on top of the other a distance apart along an axis. The magnitude of the field of a line decreases with increasing distance from the line—the magnetic fields characterizing a line field accordingly differ in their strength.

The coil configurations are arranged along an axis at a distance corresponding to the spacing of the aerials. Advantageously, the axial distance of the coil configurations corresponds to the axial spacing of the aerials. The aerials can be positioned in the measuring ranges of the coil configurations, for example in the centre thereof. The positioning of the aerials is effected by means of support elements or frames for the coils of the coil configurations, which support elements or frames have, for example, openings for pushing through the locating device or the aerials. The openings are adapted to the dimensions of the locating device and/or of the aerials. For calibrating monoaxial aerials, the openings are extended, for example, in the axial direction of the aerials so that the aerials are pushed into the support element or frame and can be positioned at the measuring ranges. The coil configurations are preferably identically formed and oriented.

The coil configurations are formed according to the type of aerials to be calibrated. For aerials which measure exclusively the magnitude of the magnetic fields, a coil configuration in each case comprises a pair of coils. With pairs of Helmholtz coils, homogeneous magnetic fields known with respect to strength and direction can be generated in a known manner.

For multiaxial aerials, the coil configuration can be designed with four or six pairs of coils, such as pairs of Helmholtz coils. As a result, magnetic fields can be generated in two or three directions in space and the fields can be detected in a plurality of directions in space by means of the aerials. It is thus also possible to calibrate locating devices which determine not only the distance to a supply line but also a direction vector. A locating device having two aerials arranged a distance apart is, for example, the "Digicat" of the Applicant Leica Geosystems in Heerbrugg. A locating device having two or more aerials a distance apart is described in EP 0 758 457.

By means of the linear arrangement of the coil configurations at distances corresponding to respective aerial spacings, it being possible to provide a first, second and optionally further alternating magnetic field in a first, second and optionally further coil configuration, which alternating fields can be generated simultaneously and in different strengths, it is possible simultaneously to detect the first field by means of a first aerial, the second field by means of a second aerial and the optionally further fields by means of optionally further aerials arranged fixed distances apart. Since the fields are furthermore generated in such a way that the respective strength differences of the fields correspond to the respective relative distances of the fields so that a single field is simulated at two—or more—measuring positions an appropriate distance apart, the measurement by means of the aerials corresponds to the measurement of a defined magnetic field for two—or more—distances.

Because the magnetic fields set in a defined manner are generated, with respect to their strengths, in ratios which correspond to typical depth values of detection objects of a location device to be calibrated, the location device can be calibrated with the depth values by means of the calibration apparatus according to the invention.

For the defined generation of the time-variable alternating fields, a defined electromagnetic signal for generating a time-variable coil current is provided by means of a signal generator. In order to characterize a signal shape of one of the lines or transmitters mentioned above, the signal is, for example, sinusoidal. If an alternating voltage is applied to the coils of the respective coil configurations, a current flow is generated in the coils, which current flow generates an alternating magnetic field. The time-variable magnetic field induces a voltage between the ends of a conductor, such as a coil, of the aerials, which induced voltage is dependent on the magnitude of the magnetic field and on the aerial parameters. In the calibration of the aerials, the aerial parameters are eliminated from the calibration.

The signal is defined with respect to the signal parameters of frequency and amplitude. The setting or choice of the signal parameters can be made manually or in an automated manner, for example by means of a frequency- and voltage-controlled signal generator. The signal generator may furthermore have switching electronics by means of which a discretely specifiable quantity of discrete ratios is provided for the fields of the coil configurations. For calibrating the locating device, selected ratios are set or a sequence of specified ratios is run through. With switching electronics integrated in the signal generator, the calibration can be controlled by means of the signal generator. If the signal generator furthermore has a data interface for a data link with a locating device, the entire calibration process can be carried out in an automated manner by means of the signal generator.

Switching electronics for producing defined field magnitude ratios can, however, also be provided as an external component and, for example, connected between signal generator and coil configurations. The switching electronics may be manually operable. The switching electronics can also be designed for automatic operation via an interface by means of a data processing unit. A data processing unit can be provided and designed additionally or alternatively thereto in order to communicate calibration settings to the locating device and optionally to control the signal generator. Tapping of the aerial outputs and processing thereof by means of the data processing unit can also be effected, the aerial output optionally being tapped directly as a difference value or as an apparent distance parameter.

In the description of the invention, the measuring means—magnetic field detectors—of a locating device calibrated by means of the calibration method according to the invention and of the calibration apparatus according to the invention are referred to as aerials. Of course, locating devices having alternative magnetic field detectors, such as magnetometers or Hall sensors, can also be calibrated. It is also evident that calibration method and apparatus are suitable not only for locating devices for the detection of supply lines but also for hand-held locating devices for the detection of alternative underground or inaccessible objects in which alternating magnetic fields occur.

The calibration method according to the invention and the calibration apparatus according to the invention are described or explained in more detail below, purely by way of example, with reference to working examples shown schematically in the drawing. Specifically, FIG. 1 shows a diagram for explaining the calibration method;

FIG. 3 shows working examples for coil configurations of a calibration apparatus according to the invention and working examples for aerials;

The diagrams of the following figures should not be considered as being to scale.

Figure 1:
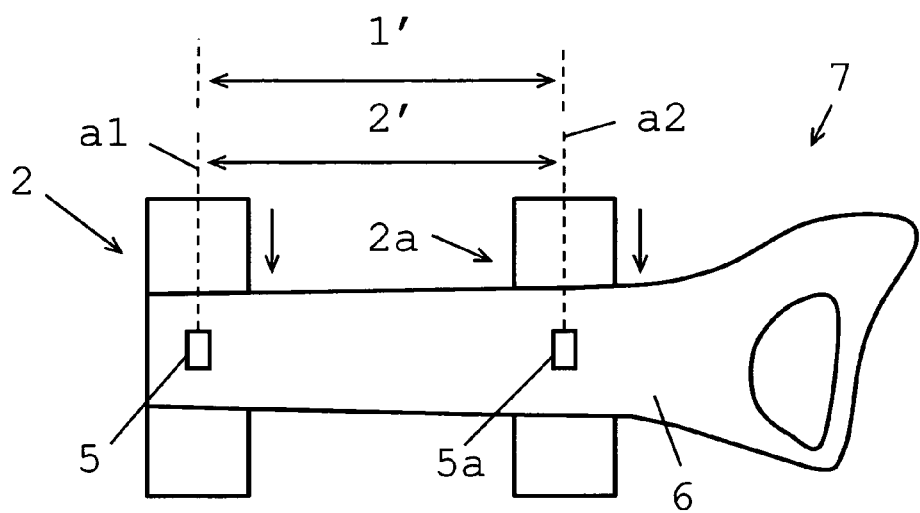

FIG. 1 shows a diagram for explaining the calibration method according to the invention for a locating device 7. The locating device 7 has a first aerial 5 and a second aerial 5a, which are arranged at a known axial spacing 2' relative to one another in a housing 6 of the locating device 7. According to the invention the homogeneous magnetic field known with respect to strength and dimension is generated in each case in a first measuring range 2 and a second measuring range 2a, the measuring ranges having, relative to one another, an axial spacing 1' corresponding to the axial spacing 2' of the aerials 5, 5a. The arrows indicate the direction of the fields. The fields are generated in that direction in space in which the aerials 5, 5a can receive signals. In the configuration shown, the first aerial 5 can measure magnetic field components parallel to its axis a1 and the second aerial 5a can measure magnetic field components parallel to its axis a2. The aerials 5, 5a may be in the form of coils, the centre of which lies on the same axis. Furthermore, the aerials 5, 5a are advantageously formed for a plurality of frequency bands.

Figure 2A:
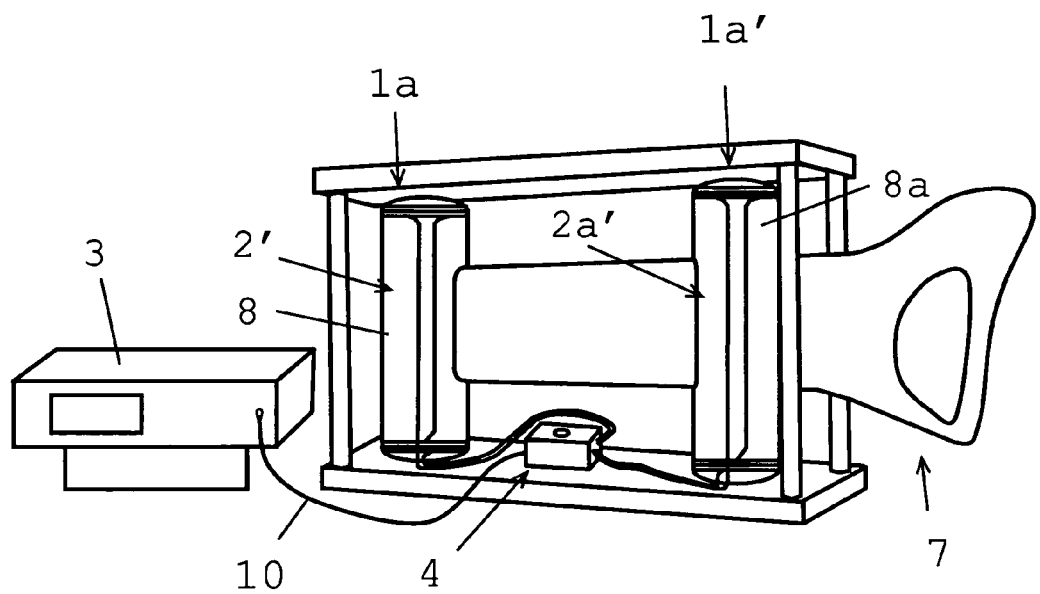
FIG. 2A shows a first working example of a calibration apparatus according to the invention.

FIG. 2A shows a first working example of a calibration apparatus according to the invention. The calibration apparatus has a first coil configuration 1a and a second coil configuration 1a', which coil configurations are in the form of—non-ideal—pairs of Helmholtz coils and can have windings in the same direction. The first and second coil configurations 1 and 1a are arranged a distance apart such that simultaneously a first aerial of a locating device 7 can be positioned in a first measuring range 2' of the first coil configuration 1a and a second aerial of the locating device 7 can be positioned in a second measuring range 2a' of the second coil configuration 1a', the aerials being mounted in the locating device 7 a defined distance apart. The coils of the pairs of coils are arranged on a first and second cylindrical coil support element 8 and 8a, which in each case have an elongated opening for pushing through the locating device 7. The opening is provided in each case in the centre of the pairs of coils, which lies in the respective measuring ring. The openings are elongated in the direction of the aerial axes.

The calibration apparatus furthermore has a signal generator 3 for generating the coil current. By means of the coil current and the known coil geometry, the fields in the pairs of Helmholtz coils can be set in a defined manner with respect to strength and direction. A sinusoidal signal of a certain frequency and amplitude is set on the signal generator 3 in order to supply the pairs of Helmholtz coils with alternating current. The superposed fields of the coils of the respective pairs of coils provide in each case a substantially homogeneous magnetic field within the pairs of Helmholtz coils.

The signal of the signal generator 3 is fed by a cable 10 into switching electronics 4 of the calibration apparatus. The switching electronics 4 is connected between signal generator 3 and pairs of Helmholtz coils. In the switching electronics 4, the signal of the signal generator 3 is divided into a first signal of a first amplitude for the first coil configuration 1a and a second signal of a second amplitude for the second coil configuration 1a'. Thus, defined alternating magnetic fields variable relative to one another can be generated in the measuring ranges 2', 2a' of the coil configurations 1, 1a'.

The magnitude of the magnetic fields is measured by means of the aerials of the locating device 7. The aerial outputs can be tapped via an interface on the locating device 7. If the locating device 7 has already been calibrated and is being recalibrated in the calibration apparatus the aerial outputs can be tapped as apparent distance values stored in software of the locating device 7. The apparent distance values can then be compared with true distance values established on the basis of the set fields and can optionally be corrected or replaced.

In an initial calibration of the locating device 7, the distance values set in each case can be directly coordinated with the corresponding aerial outputs or with a difference value or field ratio derived from the aerial outputs.

Figure 2B:
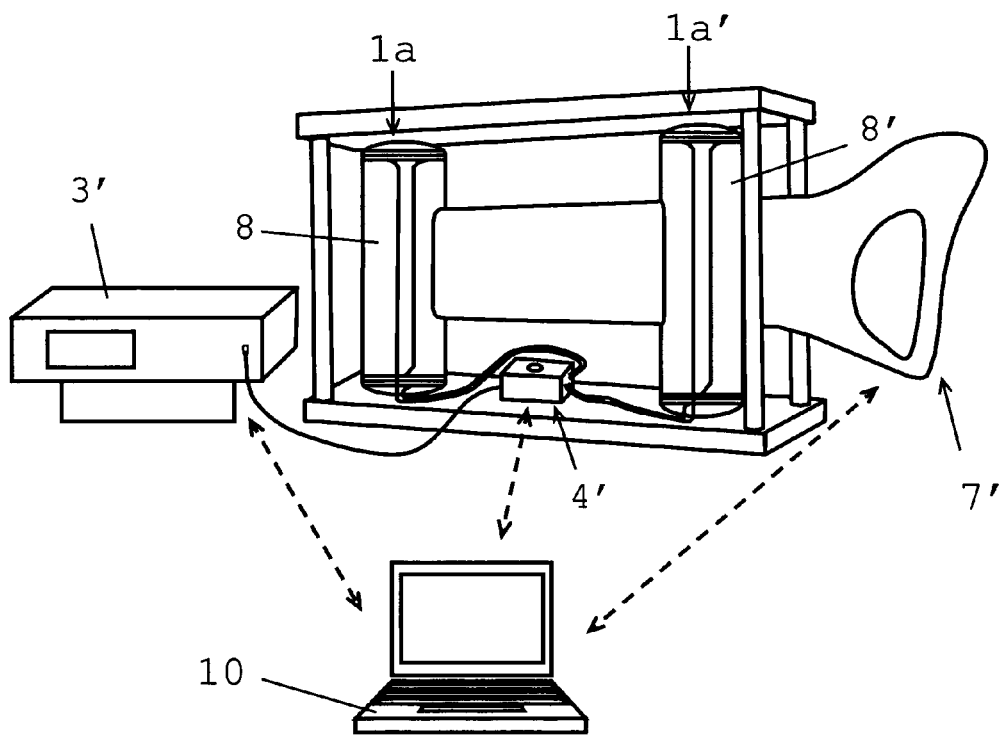
FIG. 2B shows a second working example of a calibration apparatus according to the invention.

FIG. 2B shows a second working example of a calibration apparatus according to the invention. The measuring setup corresponds to that of FIG. 1, apart from the use of a computer 10 as a data processing unit in the measuring setup. The calibration process can be controlled by means of a computer 10. The latter communicates via appropriate interfaces in each case with the signal generator 3', the switching electronics 4' and the locating device 7'. By means of the computer 10, the signal generator 3' can be controlled with respect to frequency and amplitude of the signals, and the switching electronics 4' with respect to the field ratios produced, and the locating device 7' can be calibrated. Calibration takes place in an automated manner, calibration settings for different signal frequencies and—for a respective signal frequency—different field ratios being transmitted to the locating device 7'.

Figure 2C:
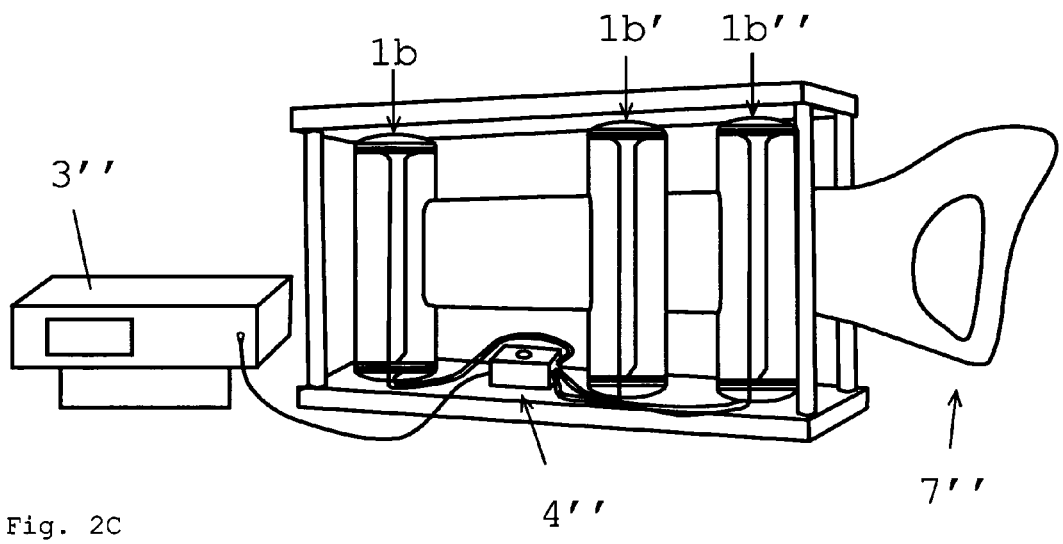
FIG. 2C shows a third working example of a calibration apparatus according to the invention.

The third working example of a calibration apparatus according to the invention in FIG. 2C shows an arrangement comprising a first pair 1b of coils, a second pair 1b' of coils and a third pair 1b'' of coils for a locating device 7'' having three aerials. Three aerials arranged a distance apart vertically relative to a reference surface—such as an underground surface of the Earth—permit the determination of the depth of an object with greater accuracy than two aerials. The calibration is effected according to the above statements with division of the signal of the signal generator 3'' in the switching electronics 4'' into three signals and settings of in each case two specifiable field ratios for a measurement.

FIG. 3 shows, in a plurality of partial FIGS. 3A, 3B, 3C, possible developments of coil configurations for corresponding aerials, which are shown by way of example as coils in the partial FIGS. 3D, 3E and 3F.

In a one-axis coil configuration 1a comprising a pair of Helmholtz coils as in FIG. 3A, a homogeneous magnetic field is generated in the direction of the axis a of the pair of coils. The field in this direction can be measured, for example, by means of a one-axis aerial having the coil 4a shown in FIG. 3D, with coil axis a' parallel to the axis a of the pair of coils, while the aerial can be calibrated with respect to the field. A two-axis aerial comprising the first coil 5d and the second coil 5d' orthogonal to the first coil 5d from FIG. 3E can likewise be calibrated using the one-axis coil configuration 1A from FIG. 3A, by first positioning the first coil 5d in the one-axis coil configuration 1a and then turning the aerial through 90° and positioning the second coil 5d' in the one-axis coil configuration 1a.

In order to be able to calibrate the two-axis aerial from FIG. 3E without having to rotate it, a two-axis coil configuration 1d comprising two pairs of coils can be set up as shown in FIG. 3B. With this two-axis coil configuration 1d, a magnetic field can be generated in two directions in space.

The three-axis coil configuration 1e comprising three pairs of coils from FIG. 3D generates a field in all three directions in space. A three-axis area aerial comprising the first coil 5e, the second coil 5e' and the third coil 5e'', which coils are arranged in each case orthogonally to one another, from FIG. 3F can be positioned in the measuring range of the three-axis coil configuration 1e and calibrated without the aerial having to be rotated.

In a calibration apparatus according to the invention, each of the coil configurations shown in FIGS. 3A-3C can be used—depending on the locating device to be calibrated.

Figure 4:
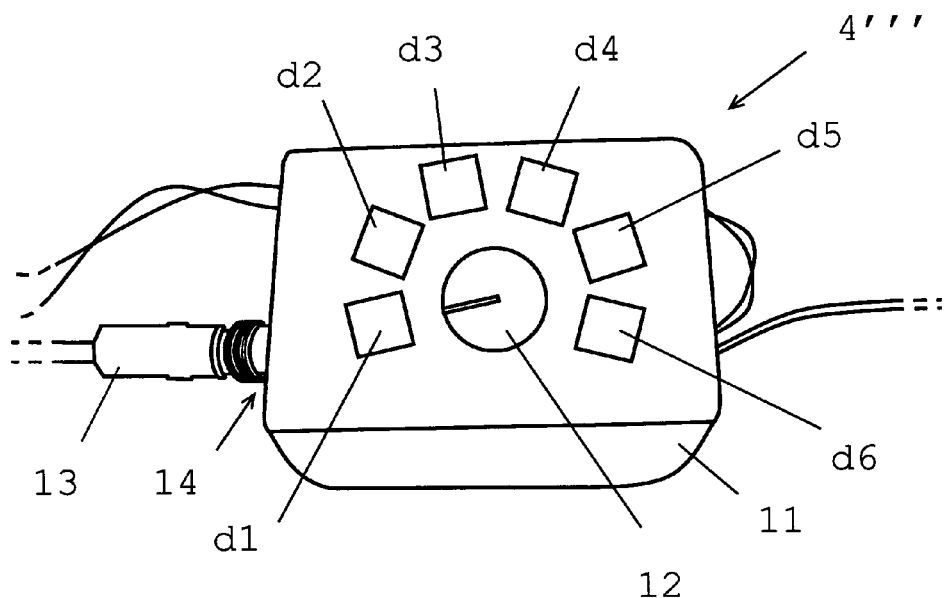
FIG. 4 shows a working example of switching electronics of a calibration apparatus according to the invention and FIG. 5 shows a circuit diagram of the circuit of the switching electronics from FIG. 4.
Figure 5:
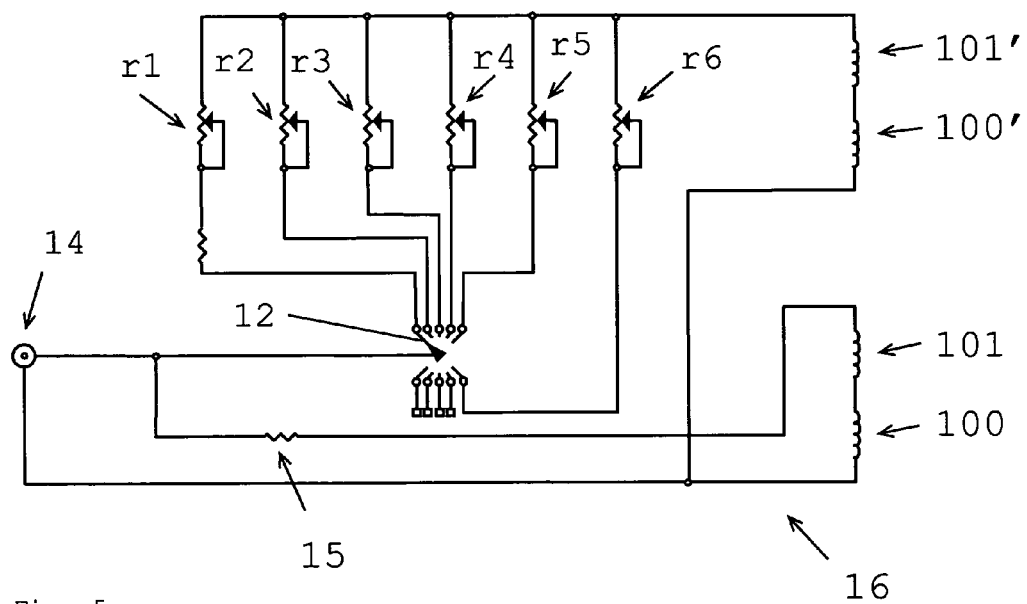

FIGS. 4 and 5 show a working example for switching electronics 4''' of a calibration apparatus according to the invention. The switching electronics 4''' comprises an electronic circuit 16 arranged in housing 11. An electromagnetic signal is fed via a two-pin plug 13 to a BNC connection 14 into the circuit 16.

As is evident from the circuit shown in FIG. 5, the signal is passed into two separate circuits. A pair of coils is present in each circuit. The signal is therefore divided into a first signal for the first pair of coils in the first circuit and a second signal for the second pair of coils in the second circuit.

The first circuit is fixed and has a resistance 15 connected in series and having a fixed value. The signal travels from the BNC connection 14 to the first coil 100 of the first pair of coils and via the first coil 100 to a second coil 101 of the first pair of coils. As a result of this and as a result of the identical winding of the coils, the same coil current passes through the first coil 100 and the second coil 101.

The strength of the second signal is variable in the second circuit by completing the circuit with resistances of different magnitudes. The choice of a resistance is made by means of a rotary switch 12. In the circuit shown, the second circuit can be completed with six different potentiometers r1, r2, r3, r4, r5, r6 which in each case generate a signal of different strength. The signal passes, analogously to the first circuit, through the coils 100', 101'.

The potentiometers r1-r6 are set from preceding measurements so that defined ratios of the magnitude of the field of the first pair of coils and that of the field of the second pair of coils are produced. In the working example shown, the ratios set are 1:1 (i.e. two identical normalized fields), 1:1.2, 1:1.24, 1:1.31, 1:1.44 and 1:1.73. These correspond to a normalization d1 and the distances d2=2.4 m, d3=2 m, d4=1.5 m, d5=1 m and d6=0.5 m of a defined transmitter, such as a supply line or an alternative underground object. Further ratios can be produced by assigning the connections which are not assigned.

The invention claimed is:

1. A calibration method for a hand-held locating device for locating lines which generate magnetic fields, the locating device comprising at least a first and second aerial, which aerials are arranged a fixed distance apart, with a calibration apparatus comprising at least a first coil configuration with a first pair of coils and a second coil configuration with a second pair of coils, which coil configurations are arranged a distance apart corresponding to the aerials, the calibration method comprising:

generating a first alternating magnetic field of the first coil configuration and of a second alternating magnetic field of the second coil configuration in a specifiable ratio with respect to the strengths of the magnetic fields, the magnetic fields each being homogeneous within measuring ranges defined between the coils of each pair of coils, and the specifiable ratio being correlated to a distance parameter representing a distance from a line to the locating device;

detecting the magnetic fields by means of the aerials positioned in the measuring ranges and deriving an actual ratio with respect to the strengths of the detected magnetic fields; and calibrating the locating device by using a calibration setting.

2. A calibration method according to claim 1, wherein, the calibration setting comprises coordinating the distance parameter with the actual ratio.

3. A calibration method according to claim 2, wherein, coordinating the distance parameter with the actual ratio includes putting the distance parameter coordinated to the actual ratio into a software of the locating device.

4. A calibration method according to claim 1, wherein, the step of detecting comprises measuring the strengths of the detected magnetic fields by means of the aerials of the locating device.

5. A calibration method according to claim 1, wherein the specifiable ratio is selected from a specified quantity of discrete ratios.

6. A calibration method according to claim 5, wherein the quantity contains at least one of the following ratios:

1:1, 1:1.2, 1:1.24, 1:1.31, 1:1.44, and/or 1:1.73.

7. A calibration method according to claim 1, wherein the magnetic fields are generated by means of electromagnetic signals of at least one of the following frequencies:

750 Hz, 20 kHz, 8.192 kHz, and/or 32.768 kHz.

8. A calibration method according to claim 7, wherein the magnetic fields are generated by means of electromagnetic signals sequentially or selectively of all the following frequencies:

750 Hz, 20 kHz, 8.192 kHz, and 32.768 kHz.

9. A calibration method according to claim 7, wherein the method is repeated at least once, the specifiable ratio and/or the frequency being varied with each repetition.

10. A calibration apparatus for a hand-held locating device for locating lines which generate magnetic fields, comprising;
 a first coil configuration with a first pair of coils having a first measuring range defined between the coils;
 a second coil configuration with a second pair of coils having a second measuring range defined between the coils, it being possible to generate, by means of electromagnetic signals:
  a substantially homogeneous first alternating magnetic field in the first measuring range, and
  a substantially homogeneous second alternating magnetic field in the second measuring range in a specifiable ratio with respect to the strength of the magnetic fields, the specifiable ratio being correlated to a distance parameter representing a distance from a line to the locating device, and it being possible to position aerials of the locating device in the measuring ranges for detecting the magnetic fields, and
 a signal generator for providing the signals, wherein the coil configurations are arranged a distance apart so that the magnetic fields can be simultaneously detected in the measuring ranges by means of at least two aerials of the locating device, the aerials are arranged a fixed distance apart corresponding to the distance of the coil configurations, it being possible to derive an actual ratio with respect to the strengths of the magnetic fields detected.

11. A calibration apparatus according to claim 10, wherein the windings of each pair of coils are in the same direction.

12. A calibration apparatus according to claim 10, wherein the coil configurations have in each case two or three pairs of coils.

13. A calibration apparatus according to claim 12, wherein the pairs of coils include pairs of Helmholtz coils.

14. A calibration apparatus according to claim 10, wherein the signal is a sinusoidal signal.

15. A calibration apparatus according to claim 10, wherein the calibration apparatus has switching electronics, by means of which switching electronics a specifiable quantity of discrete ratios is provided, which ratios can be selected or can be provided sequentially.

16. A calibration apparatus according to claim 10, wherein the calibration apparatus has a date interface for a data link to the locating device, it being possible to communicate at least the distance parameter via the data interface.

17. A calibration apparatus according to claim 10, wherein the first coil configuration has a first a coil support element and the second coil configuration has a second coil support element, which coil support elements have in each case an opening for pushing through the locating device and/or the aerials, the openings extending in particular in the direction of the aerial axes.

* * * * *